(12) United States Patent
Astrakhan

(10) Patent No.: US 7,008,145 B2
(45) Date of Patent: Mar. 7, 2006

(54) MILLING CUTTER AND INSERT THEREFOR

(75) Inventor: Eduard Astrakhan, Kiryat-Motzkin (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 10/894,007

(22) Filed: Jul. 20, 2004

(65) Prior Publication Data
US 2005/0019110 A1    Jan. 27, 2005

(30) Foreign Application Priority Data
Jul. 27, 2003   (IL) .................................. 157111

(51) Int. Cl.
*B23L 5/02*     (2006.01)
(52) U.S. Cl. ........................... 407/35; 407/67; 407/113
(58) Field of Classification Search .................. 407/35, 407/48, 53, 42, 64, 67, 70, 113
See application file for complete search history.

(56) References Cited

U.S. PATENT DOCUMENTS

| 3,574,911 A | 4/1971 | Penoyer |
| 3,636,602 A * | 1/1972 | Owen .......................... 407/113 |
| 3,742,565 A | 7/1973 | Boboltz et al. |
| 3,875,631 A | 4/1975 | Malinchak |
| 3,922,766 A * | 12/1975 | Malinchak .................... 407/40 |
| 4,248,553 A | 2/1981 | Kraemer |
| 4,681,486 A * | 7/1987 | Hale .......................... 407/114 |
| 4,936,714 A | 6/1990 | Demircan |
| 4,936,719 A | 6/1990 | Peters |
| 5,653,274 A | 8/1997 | Johnson et al. |
| 6,116,824 A * | 9/2000 | Strand et al. ................. 407/40 |
| 6,238,133 B1 * | 5/2001 | DeRoche et al. ......... 403/359.1 |
| 6,508,612 B1 * | 1/2003 | Baca .......................... 407/43 |
| 6,540,448 B1 * | 4/2003 | Johnson ....................... 407/35 |
| 6,599,061 B1 * | 7/2003 | Nelson ........................ 407/114 |
| 6,796,750 B1 * | 9/2004 | Men ........................... 407/35 |
| 2002/0037199 A1 | 3/2002 | Satran et al. |

FOREIGN PATENT DOCUMENTS

| DE | 9305518 U | 4/1993 |
| FR | 2431897 | 7/1978 |
| JP | 08206910 | 1/1995 |
| WO | WO 9713605 | 10/1995 |

* cited by examiner

Primary Examiner—Willmon Fridie, Jr.
(74) Attorney, Agent, or Firm—Womble Carlyle

(57) ABSTRACT

A milling cutter having a cutter body with a plurality of cutting inserts secured thereto. Each cutting insert has a serrated peripheral surface comprising crests and troughs which are aligned with crests and troughs of serrations of an adjacent portion of the cutter body.

18 Claims, 6 Drawing Sheets

MILLING CUTTER AND INSERT THEREFOR

FIELD OF THE INVENTION

The present invention relates to a milling cutter having indexable cutting inserts with serrated cutting edges for metal cutting operations.

BACKGROUND OF THE INVENTION

Cutting inserts with serrated cutting edges enable higher metal removal rates as compared with cutting inserts having non-serrated cutting edges. However, this is achieved at the expense of rougher surface finish. In order to improve the surface finish, the cutting inserts are mounted on the milling cutter with the serrations of consecutive cutting inserts offset, or out of phase, in relation to each other.

There are many examples of cutting inserts with serrated cutting edges disclosed in the art. Triangular, square, round, and rectangular shaped cutting inserts are disclosed, respectively, in U.S. Pat. No. 3,574,911; U.S. Pat. No. 3,636,602; U.S. Pat. No. 3,922,766; and U.S. Pat. No. 4,936,719.

However, all the prior art milling cutters using cutting inserts with serrated cutting edges suffer from the same problem, namely, the operative cutting teeth (i. e., "crests" of the serrations) are not supported by the milling cutter body. In other words, the operative cutting teeth project beyond the adjacent milling cutter body surface. Consequently, the operative cutting teeth are liable to break off during milling operations.

Moreover, the prior art cutting inserts with serrated cutting edges all have the form of flat slabs with opposing flat parallel rake and base surfaces. When such prior art inserts are mounted in an insert pocket, the flat base surface of the cutting insert abuts a corresponding flat support surface of the insert pocket. The cutting insert is retained in the insert pocket by means of a clamp that presses down on the rake surface of the cutting insert. Such an arrangement is not particularly robust, and twisting moments acting on the cutting insert during milling operations will tend to rotate the cutting insert from its initial position.

It is an object of the present invention to provide a milling cutter and a cutting insert therefor, the cutting insert having serrated cutting edges, that significantly overcome the aforementioned disadvantages.

SUMMARY OF THE INVENTION

In accordance with the present invention there is provided a milling cutter comprising a cutter body having at least one cutting portion with a replaceable cutting insert having a serrated cutting edge secured thereto, the at least one cutting portion having a serrated outer surface and the cutting insert having an aligned matching serrated peripheral surface.

In accordance with a preferred embodiment of the present invention, the at least one cutting portion comprises an insert pocket having a generally annular support surface with a recess extending downwardly from the support surface to a base surface with a peripheral wall extending therebetween.

The cutting insert comprises an upper rake surface, an intermediate abutment surface and the serrated peripheral surface extending therebetween, the serrated peripheral surface intersecting the upper rake surface at the serrated cutting edge, a protrusion extends downwardly from the intermediate abutment surface, the protrusion comprising an outer surface extending between the intermediate abutment surface and a bottom surface.

Preferably, the outer surface of the protrusion comprises four flat protrusion side surfaces interconnected by protrusion corners and the peripheral wall of the recess comprises four recess side surfaces interconnected by recess corners.

In accordance with a preferred embodiment of the present invention, a threaded bore extends downwardly from the base surface of the recess, a through bore extends between the upper rake surface and the bottom surface of the cutting insert, and a retaining screw passes through the through bore and threadingly engages the threaded bore, thus locating the protrusion in the recess and securing the cutting insert to the insert pocket.

In accordance with the present invention, the intermediate abutment surface of the cutting insert abuts the support surface of the insert pocket.

Preferably, two adjacent flat protrusion side surfaces abut two adjacent recess side surfaces of the recess.

Further preferably, there is a gap between the bottom surface of the protrusion and the base surface of the recess.

Yet further preferably, there is a clearance between each recess corner and each adjacent protrusion corner.

BRIEF DESCRIPTION OF THE DRAWINGS

For a better understanding of the present invention and to show how the same may be carried out in practice, reference will now be made to the accompanying drawings, in which:

FIG. 5b is a bottom perspective view of the cutting insert shown in FIG. 5a;

FIG. 6 is a side view of the cutting insert shown in FIG. 5a;

FIG. 7 is a bottom view of the cutting insert shown in FIG. 5a;

DETAILED DESCRIPTION OF A PREFERRED EMBODIMENT

Figure 1:
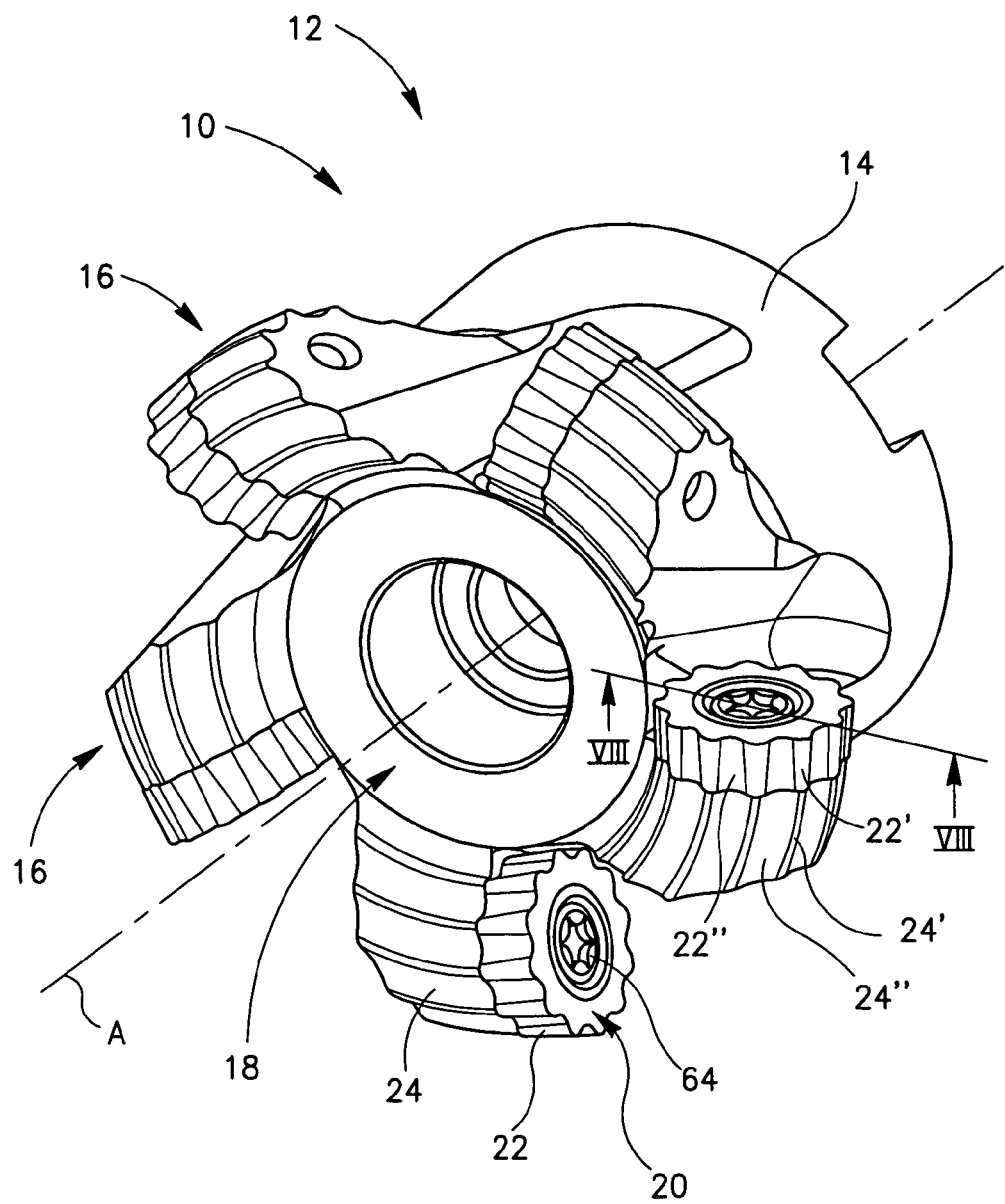
FIG. 1 is a perspective view of a milling cutter with serrated cutting inserts according to the present invention.
Figure 2:
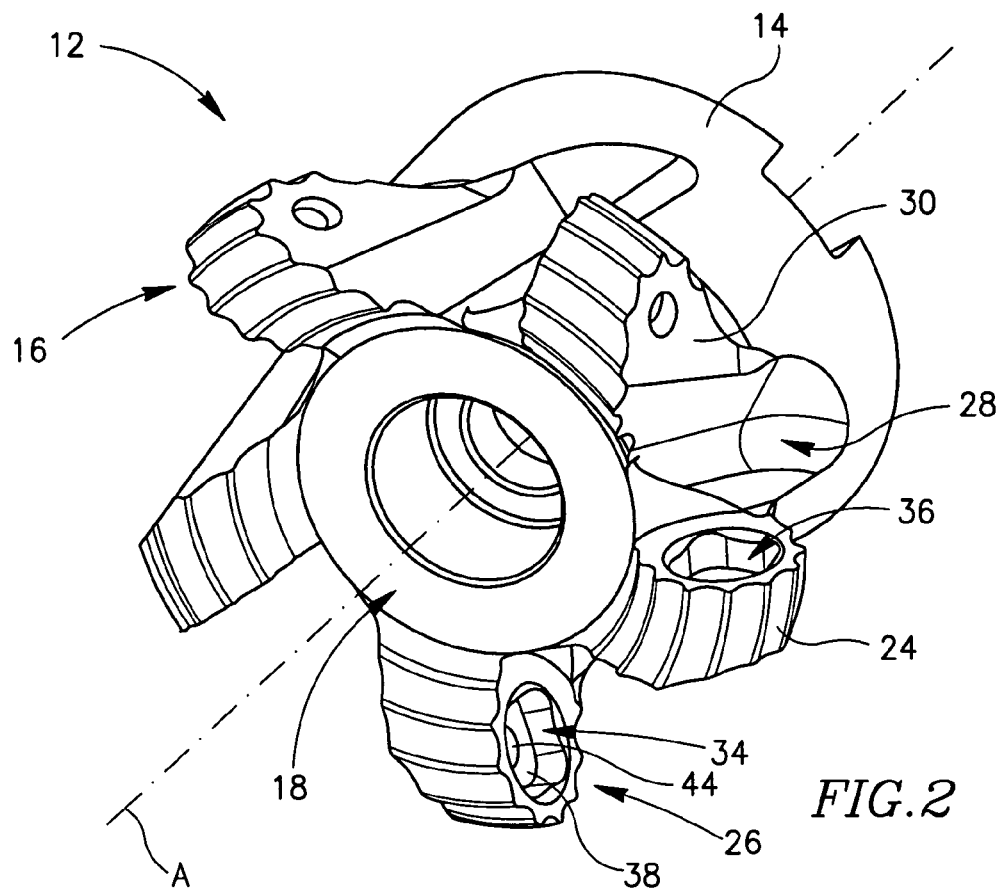
FIG. 2 shows the cutter body of the milling cutter tool of FIG. 1 with the cutting inserts removed from cutting portions of the cutter body.
Figure 3:
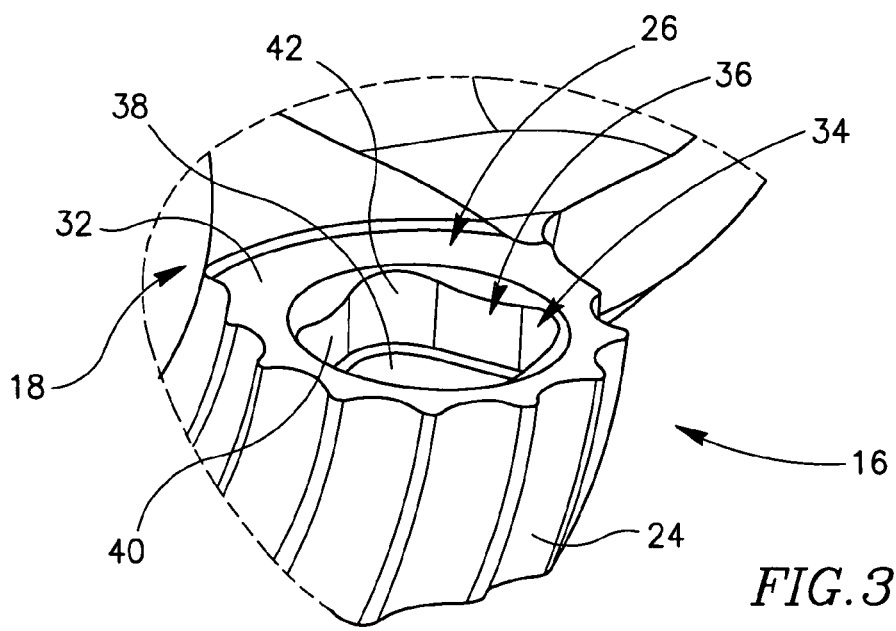
FIG. 3 is a perspective view of a cutting portion of the cutter body shown in FIG. 2, showing an insert pocket.
Figure 4:
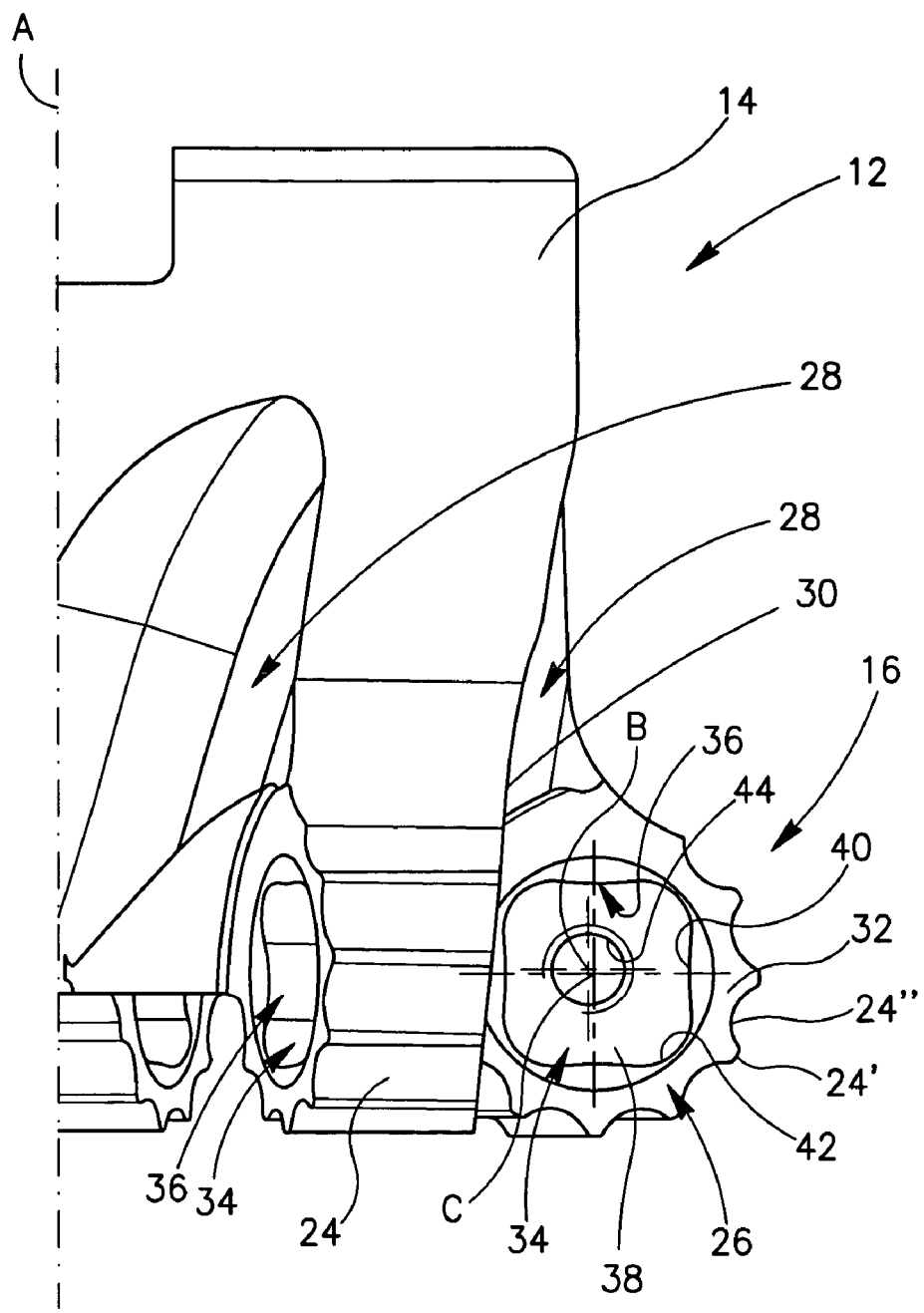
FIG. 4 is a side view of the cutter body shown in FIG. 2, showing an insert pocket in a top view.
Figure 5A:
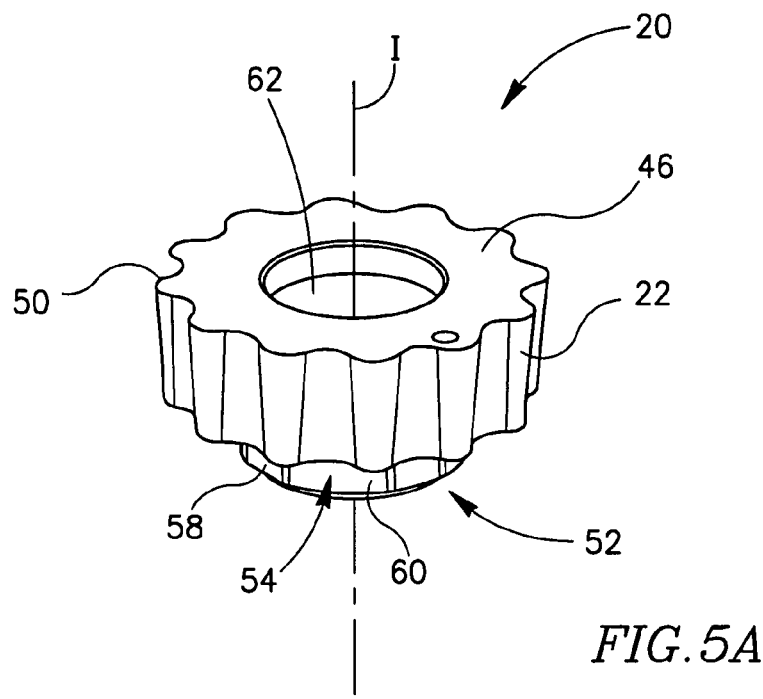
FIG. 5a is a top perspective view of a cutting insert in accordance with the present invention.
Figure 5B:
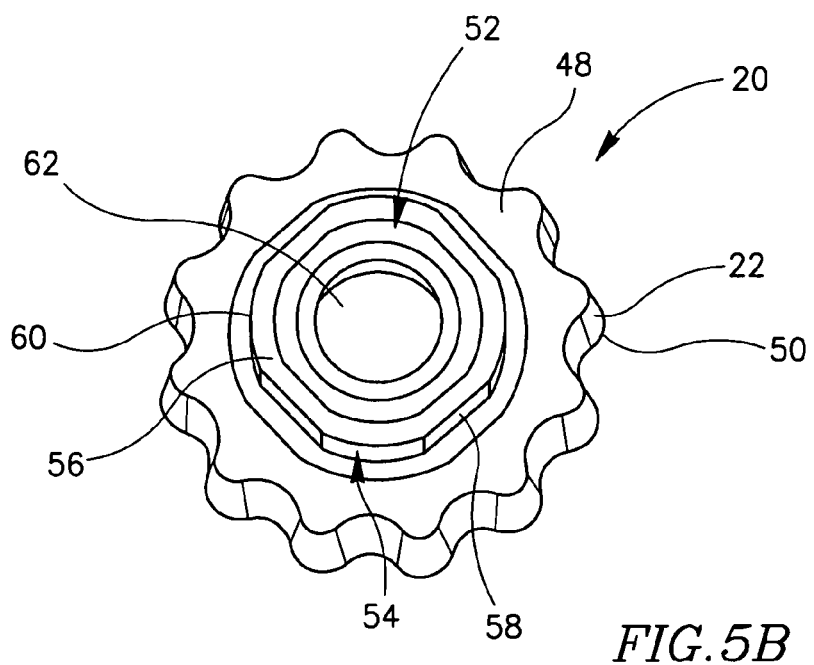
Figure 6:
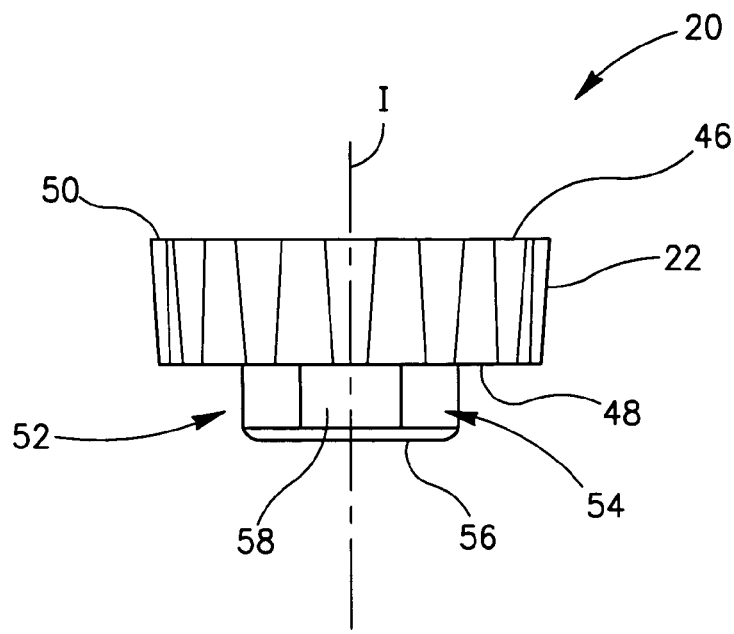
Figure 7:
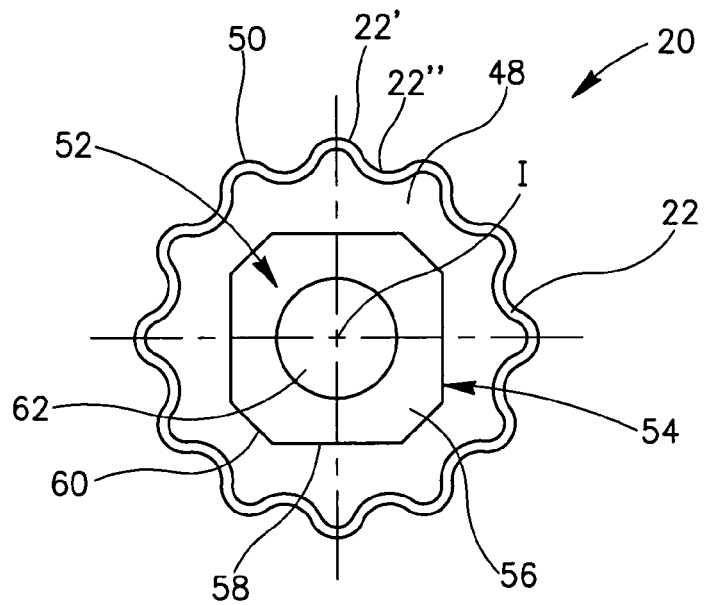

Attention is first drawn to FIGS. 1 to 4. A milling cutter 10 has an axis of rotation A and comprises a cutter body 12 having a rear shank 14 and five cutting portions 16 adjacent a front face 18 of the cutter body 12. Each cutting portion 16 has a replaceable and indexable cutting insert 20 secured thereto. Each cutting insert 20 has a serrated peripheral surface 22 comprising crests 22' and troughs 22", and each cutting portion 16 of the cutter body 12 has a serrated outer surface 24 comprising crests 24' and troughs 24". The serrated peripheral surface 22 of each cutting insert 20 matches, and is aligned with, the serrated outer surfaces 24 of the cutting portion 16 to which it is secured. In other words, for a given cutting insert 20 secured to a given cutting portion 16, the crests 22' and troughs 22" of the serrated peripheral surface 22 of the cutting insert 20, are aligned with the crests 24' and troughs 24" of the serrated outer surface 24 of the cutting portion 16.

Each cutting portion 16 comprises an insert pocket 26 and a chip gullet 28. The chip gullet 28 of a given cutting portion 16 defines a rear wall 30 of an adjacent cutting portion 16. The serrated outer surface 24 of the cutting portion 16 extends between the insert pocket 26 and the rear wall 30, and merges with the shank 14 of the cutter body 12.

The insert pocket 26 comprises a generally annular support surface 32, and a recess 34 extending downwardly from the support surface 32. The recess 34 comprises a peripheral wall 36 extending between the support surface 32 and a base surface 38 of the recess 34. The peripheral wall 36 of the recess 34 comprises four inner planar side surfaces 40 interconnected by recess corners 42. The base surface 38 of the recess 34 has a threaded bore 44 having an axis B. The threaded bore 44 is generally orthogonal to, and extends downwardly from, the base surface 38 and is eccentrically disposed in relation to the geometrical center C of the recess 34.

Figure 8:
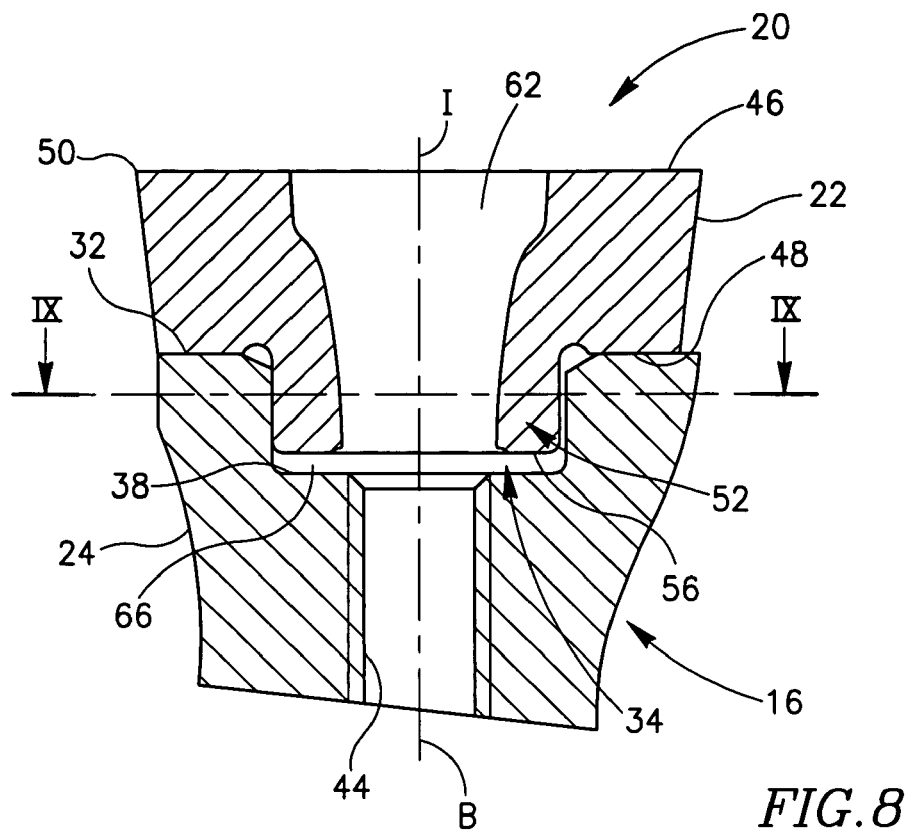
FIG. 8 is a sectional view through a cutting portion having a cutting insert mounted therein, taken in a plane including the insert symmetry axis along the line VIII—VIII in FIG. 1, with the retaining screw not shown.

Attention is now drawn to FIGS. 5a, 5b, 6, and 7. The cutting insert 20 has a serrated circular in shape in a top view, and has an insert symmetry axis I. The cutting insert 20 comprises an upper rake surface 46, an intermediate abutment surface 48, and the serrated peripheral surface 22 extending therebetween. The serrated peripheral surface 22 intersects the upper rake surface 46 at a serrated cutting edge 50. A protrusion 52, which extends downwardly from the intermediate abutment surface 48, comprises an outer surface 54 extending between the intermediate abutment surface 48 and a bottom surface 56. The outer surface 54 of the protrusion 52 has four flat protrusion side surfaces 58 interconnected by protrusion corners 60. The cutting insert 20 has a centrally disposed through bore 62 extending downwardly from the upper rake surface 46 to the bottom surface 56. With the protrusion 52 in the recess 34, the cutting insert 20 is secured to the cutting portion 16 of the cutter body 12 by means of a retaining screw 64 which passes through the through bore 62 in the cutting insert 20, and threadingly engages the threaded bore 44 in the recess 34 of the insert pocket 26, As is best seen in FIG. 8, when the cutting insert 20 is secured in the recess 34, the intermediate abutment surface 48 of the cutting insert 20 abuts the support surface 32 of the insert pocket 26 in the cutting portion 16. Since the serrated peripheral surface 22 of each cutting insert 20 matches and is aligned with the serrated outer surface 24 of the cutting portion 16 to which it is secured, each serration crest 22' of the cutting insert 20 is fully supported by a corresponding serration crest 24' of the support surface 32 of the cutting portion 16. This enhances the strength, durability and stability of the cutting insert 20.

In order to assure abutment of the intermediate abutment surface 48 of the cutting insert 20 and the support surface 32 of the insert pocket 26, there is a gap 66 between the bottom surface 56 of the protrusion 52 and the base surface 38 of the recess 34, when the cutting insert 20 is tightly secured to the insert pocket 26.

Figure 9:
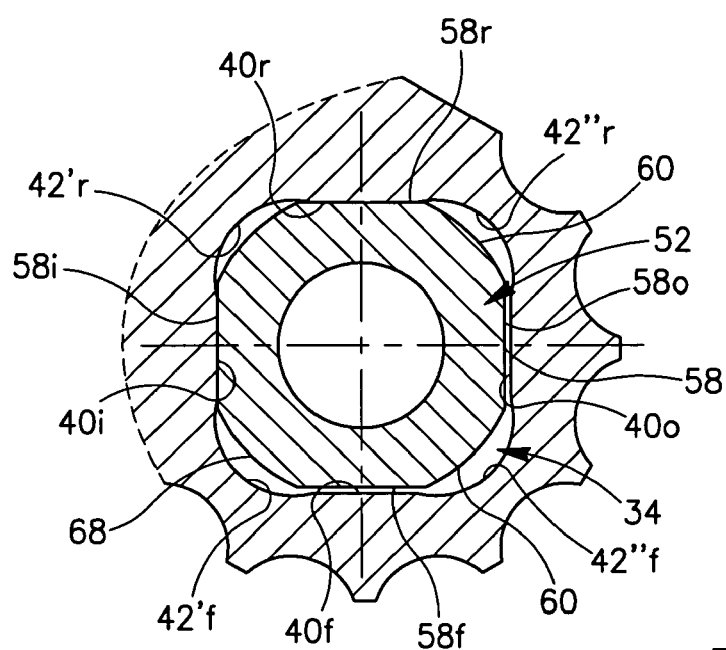
FIG. 9 is a sectional view taken along the line IX—IX in FIG. 8.

As is shown in FIG. 9 the recess 34 has four corners, a rear inner recess corner 42'r, a rear outer recess corner 42"r, a forward inner recess corner 42"f and a forward outer recess corner 42"f. With respect to the orientation of the insert pocket 26 and the cutting insert 20 as shown in FIG. 9, the four recess side surfaces 40 are termed, rear recess side surface 40r, forward recess side surface 40f, inner recess side surface 40i and outer recess side surface 40o. Similarly, the four protrusion side surfaces 58 are termed, rear protrusion side surface 58r, forward protrusion side surface 58f, inner protrusion side surface 58i and outer protrusion side surface 58o. Due to the fact that the threaded bore 44 is eccentrically disposed in relation to the geometrical center C of the recess 34, when the cutting insert 20 is securely retained in the insert pocket 26, it is urged away from the forward outer recess corner 42"f towards the rear inner recess corner 42'r. Consequently, the pair of adjacent rear and inner recess side surfaces 40r, 40i is in abutment with, respectively, the pair of adjacent rear and inner recess side surfaces 58r, 58i. With this arrangement, the cutting inserts 20 are well supported against cutting forces and can be accurately secured in the cutting portion 16 of the milling cutter 10. As can be seen in FIG. 9, a gap exists between the forward recess side surface 40f and the forward protrusion side surface 58f and between the outer recess side surface 40o and the outer protrusion side surface 58o. The protrusion corners 60 are either chamfered, or have a larger radius of curvature than the recess corners 42, so that at all times a gap exists between each recess corner 42 and each adjacent protrusion corner 60.

Consecutive cutting portions 16 are slightly rotated around the axis B of the threaded bore 44, so that the serrations of the serrated outer surface 24 of consecutive cutting portions 16, together with the serrated peripheral surfaces 22 of consecutive cutting inserts 20, are offset, or out of phase, in relation to each other in order to give a better surface finish in comparison to the situation in which there is no offset.

Although the present invention has been described to a certain degree of particularity, it should be understood that various alterations and modifications could be made, such as chip breakers of various designs on the rake surface of the cutting insert, without departing from the scope of the invention as hereinafter claimed.

What is claimed is:

1. A milling cutter comprising:
   a cutter body having at least one cutting portion provided with a serrated outer surface; and
   a replaceable cutting insert secured to the at least one cutting portion, the cutting insert having a serrated cutting edge and a serrated peripheral surface that matches, and is aligned with, the serrated outer surface; wherein:
   the serrated outer surface of the at least one cutting portion comprises a plurality of crests; and
   the serrated peripheral surface also comprises a plurality of crests.

2. The milling cutter according to claim 1, wherein the at least one cutting portion comprises an insert pocket having a support surface with a recess extending downwardly from the support surface to a base surface with a peripheral wall extending therebetween.

3. The milling cutter according to claim 2, wherein the peripheral wall of the recess comprises four recess side surfaces interconnected by recess corners.

4. The milling cutter according to claim 2, wherein the support surface has a generally annular shape.

5. The milling cutter according to claim 1, wherein the cutting insert comprises an upper rake surface, an intermediate abutment surface with the serrated peripheral surface extending therebetween, the serrated peripheral surface intersecting the upper rake surface at the serrated cutting edge.

6. The milling cutter according to claim 5, wherein the cutting insert has a protrusion extending downwardly from the intermediate abutment surface, the protrusion comprising an outer surface extending between the intermediate abutment surface and a bottom surface of the cutting insert.

7. The milling cutter according to claim 6, wherein the outer surface of the protrusion comprises four flat protrusion side surfaces interconnected by protrusion corners.

8. The milling cutter according to claim 6, wherein the cutting insert has a through bore extending between the upper rake surface and the bottom surface.

9. The milling cutter according to claim 1, wherein:
the at least one cutting portion comprises an insert pocket having a support surface with a recess extending downwardly from the support surface to a base surface with a peripheral wall extending therebetween, a threaded bore extending downwardly from the base surface of the recess;
the cutting insert comprises:
an upper rake surface and an intermediate abutment surface with the serrated peripheral surface extending therebetween, the serrated peripheral surface intersecting the upper rake surface at the serrated cutting edge;
a protrusion extending downwardly from the intermediate abutment surface, the protrusion comprising an outer surface extending between the intermediate abutment surface and a bottom surface of the cutting insert;
a through bore extending between the upper rake surface and the bottom surface; and
a retaining screw passes through the through bore and threadingly engages the threaded bore.

10. The milling cutter according to claim 9, wherein the intermediate abutment surface of the cutting insert abuts the support surface of the insert pocket.

11. The milling cutter according to claim 9, wherein there is a gap between the bottom surface of the protrusion and the base surface of the recess.

12. The milling cutter according to claim 9, wherein:
the peripheral wall of the recess comprises four recess side surfaces interconnected by recess corners; and
the outer surface of the protrusion comprises four flat protrusion side surfaces interconnected by protrusion corners.

13. The milling cutter according to claim 12, wherein two adjacent protrusion side surfaces of the protrusion abut two adjacent recess side surfaces of the recess.

14. The milling cutter according to claim 12, wherein there is a clearance between each recess corner and each adjacent protrusion corner.

15. A cutting insert comprising:
an upper rake surface;
an intermediate abutment surface;
a protrusion extending downwardly from the intermediate abutment surface; and
a serrated peripheral surface extending between the upper rake surface and the intermediate abutment surface, the serrated peripheral surface intersecting the upper rake surface at a serrated cutting edge, wherein:
the serrated peripheral surface comprises a plurality of crests.

16. The cutting insert according to claim 15, wherein the protrusion comprises an outer surface extending between the intermediate abutment surface and a bottom surface, the outer surface of the protrusion comprising four flat protrusion side surfaces interconnected by protrusion corners.

17. The cutting insert according to claim 16, wherein a through bore extends between the upper rake surface and the bottom surface.

18. A milling cutter comprising:
a cutter body having at least one cutting portion with a replaceable cutting insert having a serrated cutting edge secured thereto;
the cutting portion comprising a generally annular support surface and a serrated outer surface extending therefrom, the serrated outer surface comprising a plurality of crests;
the cutting insert comprising an upper rake surface, an intermediate abutment surface, and a serrated peripheral surface extending therebetween, the serrated peripheral surface comprising a plurality of crests and intersecting the upper rake surface at a serrated cutting edge, the serrated peripheral surface of the cutting insert matching the serrated outer surface of the cutting portion;
the intermediate abutment surface of the cutting insert abutting the support surface of the at least one cutting portion; and
the serrated peripheral surface of the cutting insert being aligned with the serrated outer surface of the cutting portion, so that each crest on the serrated peripheral surface of the cutting insert is supported by a corresponding crest on the serrated outer surface of the cutting portion.

* * * * *